Patented Mar. 7, 1939

2,150,109

UNITED STATES PATENT OFFICE 2,150,109

PREPARATION OF VAT DYESTUFFS

Otto Stallmann, South Milwaukee, Wis., assignor to E. I. du Pont de Nemours & Company, Wilmington, Del., a corporation of Delaware No Drawing. Application September 10, 1934, Serial No. 743,420

6 Claims. (Cl. 260—265)

This invention relates to improvements in the preparation of vat dyestuffs, and more particularly to the preparation of vat dyestuffs of the indanthrone series in a physical form which is especially suitable for the preparation of dye pastes and powders.

Difficulty has been experienced in preparing certain vat dyestuffs and particularly those of the indanthrone class in a physical form suitable for dyeing and printing purposes. German Patents 129,848 and 135,407 describe the purification of indanthrone, by precipitating it from a vat as the soda salt of the leuco indanthrone by cooling the vat to room temperature, which, when oxidized, gives well defined small needles that are claimed to be especially suitable for printing. German Patents 355,737 and 356,607 describe the preparation of indanthrone dyes in the form of extremely fine needles by treating the dyestuff in suspension or solution in concentrated sulfuric acid with certain dispersing agents.

The preparation of dyestuff pastes which consist of very small and highly dispersible color particles has become especially important in view of the increased use of the commercial dyeing process more fully described in U. S. Patents 893,384 and 1,185,943, which is generally referred to as the "pad and jig" or "pigment pad reduction method", because in this process the dyestuff must be kept in perfect suspension in the padding liquor in order to prevent uneven pigmentation and dyeing effects which are caused by the presence of undispersed conglomerates or by the excessively large size of color particles.

It is an object of the present invention to produce pastes and powders of vat dyestuffs, particularly of the indanthrone class, in extremely small, uniform and highly dispersible particles ranging in size in the main from ½ to 1 micron, and which are especially suitable because of the uniform and extremely small size of the color particles for printing and for dyeing by the pigment pad reduction method.

It is a further object of my invention to provide a process whereby the higher brominated indanthrones which cannot ordinarily be dyed by the regular vatting procedure are rendered suitable for dyeing by the pigment pad reduction method.

It is still a further object of my invention to provide a process for the preparation of vat dyestuffs of the indanthrone class in a highly dispersible physical form which can be combined with a vatting procedure that may be used in the purification or preparation of these dyestuffs, thereby obviating the necessity for special acid pasting or other treatment heretofore used.

A further object of this invention is to prepare dyestuffs of the indanthrone series in highly dispersible form which can be satisfactorily prepared as fluid pastes in high concentration and which will not settle out on long standing.

Other objects of my invention will appear from the following description.

I have found that anthraquinone vat dyestuffs and particularly those of the indanthrone series which can be salted out of solution or precipitated in any other suitable manner from their vats may be prepared in an extremely fine state of subdivision by precipitating them from the vats in the presence of certain novel vatting assistants, more particularly, those described in U. S. Patents 1,977,251 1,977,253 and 1,977,272, which have issued on applications that were copending herewith.

The temperature at which the precipitation of these vattable compounds is carried out exerts a pronounced influence on the size and shape of the particles. Temperatures between 5 and 35° C. have been found to be particularly suitable, whereas the use of temperatures above 35° C. as a rule usually give much larger crystals. I have found that the use of these vatting assistants in the vatting of indanthrone compounds at low temperatures gives uniformly smaller particles of the dyestuff than can be obtained without their use either when the vatted compounds or dyestuffs are isolated from the vat as leuco compound or in the keto form by air blowing the vat directly at temperatures below 35°, or by treating the vat with an oxidizing agent. In carrying out this procedure, the precipitation of the dyestuff in either the leuco or oxidized form should be brought about slowly with uniform agitation to avoid any tendency of forming large agglomerates of the dyestuff particles. For this reason I prefer to precipitate the compound in the leuco form by the gradual addition of salt in solid or in solution form, and then oxidize the suspended leuco compound. In oxidizing the leuco compound it may be treated with air or oxidizing agents in the original suspension or it may be filtered off, resuspended in water and oxidized in any desired manner. Cooling to temperatures below 5° C. may also be resorted to for precipitating the dyestuff from the vat.

Because of the use of the vatting assistants in this process, either distilled water or tap water of a hardness not greater than 100 parts per million may be used with equally good results.

The following examples are given to more fully illustrate my invention. Parts used are by weight.

Example 1

A dyestuff paste containing 100 parts of purified 3,3'-dibromo-N-dihydro-1,2,2',1'-anthraquinone azine is suspended in 10,000 parts of distilled water and 20 parts of the condensation product of dichlorhydrin with ammonia, described in U. S. Patent 1,977,272, by I. Gubelmann, are added. The temperature is now adjusted to 30° C. and there are added 80 parts of caustic soda and 100 parts of sodium hydrosulfite. The vat is stirred at a slow and uniform speed at 30 to 33° C. for 15 to 20 hours. It will be observed that after about 15 to 20 minutes of stirring after the addition of hydrosulfite, the dibromoindanthrone body is completely vatted, but upon prolonged stirring at 30 to 33° C., a precipitation of very uniform and extremely small color particles takes place, until finally after about 15 to 20 hours' stirring, practically all color is precipitated out of solution. This precipitation is probably due to the fact that dibromo-indanthrone in its leuco form is not very soluble in a dilute caustic-hydrosulfite vat, containing an excess of inorganic salt. It may also be that during the course of the prolonged stirring in contact with air a partial or complete oxidation of the hydrosulfite and even the leuco compound occurs, resulting in precipitation of the color. After 15 to 20 hours of stirring, the suspension is air-blown for several hours in order to insure complete oxidation and the precipitate is filtered off, washed alkali free and milled to a smooth color paste which is especially suitable for dyeing by the pigment pad reduction method and for printing purposes.

Example 2

A color paste containing 100 parts of purified 3,3'-dichloro-N-dihydro-1,2,2',1' - anthraquinone azine is suspended in 9000 parts of tap water (of about 100 parts hardness per million) and there are added 10 parts of the condensation product of epichlorhydrin with monomethylamine, described in U. S. Patent 1,977,253. 70 parts of caustic soda and 80 parts of sodium hydrosulfite are now stirred into the color suspension at 27 to 30° C. and the vat is stirred for 1 hour at 27 to 30° C. 200 parts of salt are now added slowly (over a period of 1 to 1½ hours) and the salted out leuco compound is now treated with a dilute water solution, containing 30 parts of the soda salt of meta-nitrobenzene-sulfonic acid. This solution is dropped into the suspension slowly and at a uniform rate, as the oxidation of the leuco compound proceeds. The bright blue precipitate is now filtered off, washed alkali free and milled to a smooth color paste. The product thus obtained is a highly dispersed color paste, consisting of very small and uniform color particles ranging in the main from ½ to 1 micron in size, especially suitable for printing purposes and piece goods dyeings by the pigment pad reduction method.

Example 3

A smoothly milled dyestuff paste, containing 100 parts of monobromo-monochloro-indanthrone (the product described in U. S. Patent 1,862,865, is diluted with 10,000 parts of water and there are added under agitation at 30 to 35° C. 10 parts of the condensation product of epichlorhydrin with ethylene diamine (described in U. S. Patent 1,977,253). 80 parts of caustic soda and 100 parts of sodium hydrosulfite are now added and the vat is stirred at 32 to 34° C. for about two hours. 50 parts of salt are then added in 5 portions within 50 minutes, making one addition every 10 minutes. The precipitate is now filtered off, the filter cake is stirred or milled for 10 to 15 hours, allowing the air to oxidize the leuco compound, while stirring, to the bright reddish-blue monochloro-monobromo-indanthrone, which is thus obtained as a strongly alkaline paste containing the dyestuff in the form of uniform, extremely small crystalline particles, very similar in shape and size to those obtained in Example 2. The paste may be freed of inorganic salts by diluting the same to 5000 parts with water, filtering off the precipitate, washing the filter cake alkaline free and milling the product to a smooth dyestuff paste, which is very much more suitable for dyeing by the pigment pad reduction method than the original color paste, consisting of amorphous color particles, such as usually are obtained when a solution of the color in concentrated sulfuric acid is poured into or diluted with much cold water and the precipitate is filtered off, washed acid free and milled to a color paste.

Example 4

A well milled color paste containing 100 parts of the bromine and chlorine containing indanthrone dyestuff described in U. S. Patent 1,862,843 (Example 4) is suspended in 9500 parts of water (either distilled or ordinary hard water). There are then added 10 parts of the condensation product of dichlorhydrin with ammonia, described in U. S. Patent 1,977,272, by I. Gubelmann. The temperature is now adjusted to 25 to 35° C. and 70 parts of caustic soda and 90 parts of sodium hydrosulfite are stirred into the suspension, which is further stirred at a slow speed until the dyestuff is completely vatted. 100 parts of common salt are now added in small portions, whereby the dyestuff is precipitated in the form of very uniform and extremely small, well dispersed particles of a distinct crystalline nature but entirely different in shape and size from the well known needles that are usually obtained when the leuco compound of an indanthrone dyestuff is salted out of its vat by the slow addition of salt at the conventional vatting temperatures (40 to 50° C.) or at lower temperatures in the absence of a vatting assistant. The suspension is air blown until the dyestuff is completely oxidized. The precipitate is now filtered off, washed alkali free and milled to a smooth color paste. The color paste thus obtained consists of dispersion of extremely small and very uniform color particles.

Example 5

100 parts of dry crude trichloro-indanthrone compound, prepared by treating purified indanthrone in nitrobenzene suspension with sulfuryl chloride according to German Patent No. 331,283, are dissolved in 800 parts of concentrated sulfuric acid (96-98% $H_2SO_4$) and the solution is poured into much cold water, the precipitate is filtered off, washed acid free and milled to a smooth color paste.

The product thus obtained is vatted at 40 to 45° C., suspended in 9500 parts of distilled water with the addition of 80 parts of caustic soda and 100 parts of sodium hydrosulfite. The vat is stirred for about 15 minutes or until the color is completely vatted. There are then added 10 parts of the condensation product of epichlorhydrin with ammonia, described in U. S. Patent 1,977,251, and the solution is cooled to 30 to 33° C.

100 parts of sodium chloride are now stirred slowly into the vat at 30 to 33° C. over a period of one hour and the salted out leuco compound is filtered off. The filter cake is suspended in 200 parts of water, and the suspension is stirred for 24 hours, while exposing the surface of the stirred suspension to the air. The dyestuff is then filtered off, washed alkali free and the filter cake is milled to a smooth color paste of about 20% color solids. The product thus obtained is very much superior in physical form and very much more suitable for pad-jig dyeings and printing purposes than the parent (acid pasted) dyestuff paste.

The padding liquor obtained from any of the products above described is especially suitable for piece goods dyeing by the pigment pad reduction method, since the extremely small size and uniformity of the color particles prevents the color suspension (padding liquor) from settling and insures a successful padding of large amounts of piece goods, free of uneven or "specky" effects. Distinctly stronger paddings and better speed of reduction in the subsequent developing or fixation process (on the "jigs") are obtained by using a color paste of this type, because in the padding process the very small color particles penetrate better and are distributed smoothly throughout the fiber, with the result that the full color is developed on the "jigs" faster than when pastes of the indanthrone type are employed, in which the greater part of the color particles are of a larger size.

The dyestuff pastes obtained as above described are also suitable for the preparation of redispersible dyestuff powders by known methods which are also suitable for dyeing by the pigment pad reduction method and for printing purposes.

Indanthrone itself or its monochloro substitution products may be vatted in the manner above described to prepare them in especially fine state of subdivision.

As disclosed in Example 5, crude indanthrone dyestuffs may be vatted by this procedure, whereby a purification may be effected simultaneously with the preparation of the compound in the particularly fine form, by filtering off the precipitated leuco compound prior to oxidation.

The amounts of caustic soda and alkaline hydrosulfite used may be varied within wide limits. The concentration of the vat (with respect to the dyestuff) may also be varied, although the vat must be sufficiently dilute to permit complete vatting of the dyestuff. The amount of vatting assistant used may also vary within wide limits. From 5 to 50 parts of assistant to 100 parts of dyestuff have been found to give satisfactory results, although the use of from 10 to 25 parts is preferred. The minimum amount that must be used will vary somewhat, depending upon the solubility of the particular indanthrone compound being treated, and on which one of the assistants is employed, since the assistants vary to some degree in their effectiveness.

Temperatures of from 5 to not materially above 35° C. may be used, although it is preferred to precipitate the dyestuff in the presence of the assistant at temperatures ranging from 20 to 35°. As illustrated in Example 5, the dyestuff may be vatted at the usual vatting temperatures (40° to 60° C.) but in this case the vat must be cooled to 35° C. or below, prior to the precipitation of the dyestuff in the presence of the vatting assistants.

I claim:

1. In the preparation of water-insoluble indanthrone compounds in a very uniformly fine state of subdivision, the step which comprises precipitating them from a vat at temperatures below 35° C. in the presence of a vatting assistant selected from the group consisting of the water-soluble condensation products of epichlorhydrin or dichlorhydrin with ammonia or an aliphatic primary amine.

2. In the preparation of water-insoluble indanthrone compounds in a very uniformly fine state of subdivision particularly suitable for printing and for dyeing by the pigment pad reduction process, the step which comprises precipitating said indanthrone compounds from a vat of the same at temperatures between 15° and 35° C. by salting in the presence of a vatting assistant selected from the group consisting of the water-soluble condensation products of epichlorhydrin or dichlorhydrin with ammonia or an aliphatic primary amine.

3. In the preparation of water-insoluble dichloroindanthrone compounds in a very uniformly fine state of subdivision particularly suitable for printing and for dyeing by the pigment pad reduction process, the step which comprises precipitating said dichloroindanthrone compound from a vat of the same at temperatures between 15° and 35° C. by salting in the presence of a vatting assistant selected from the group consisting of the water-soluble condensation products of epichlorhydrin or dichlorhydrin with ammonia or an aliphatic primary amine.

4. In the preparation of water-insoluble dichloroindanthrone compounds in a very uniformly fine state of subdivision particularly suitable for printing and for dyeing by the pigment pad reduction process, the step which comprises precipitating said dichloroindanthrone compound from a vat of the same at temperatures below 35° C., in the presence of a vatting assistant selected from the group consisting of water-soluble condensation products of epichlorhydrin or dichlorhydrin with ammonia or an aliphatic primary amine.

5. A water-insoluble indanthrone dyestuff preparation in a very uniformly fine state of subdivision obtained by a process comprising the step of claim 1.

6. A water-insoluble dichloroindanthrone dyestuff preparation in a very uniformly fine state of subdivision obtained by a process comprising the step of claim 4.

OTTO STALLMANN.